UNITED STATES PATENT OFFICE.

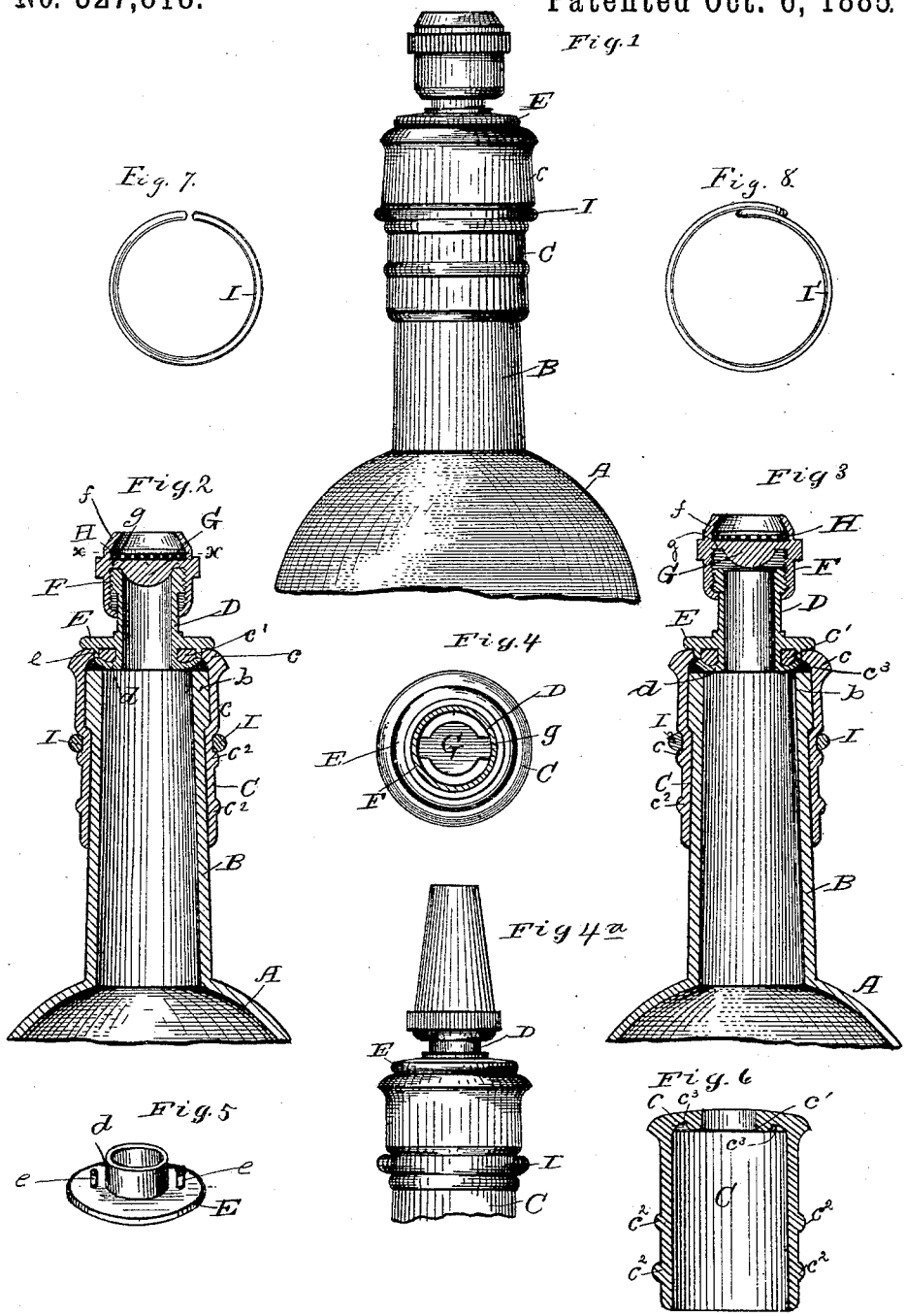

STEPHEN S. NEWTON, OF BROOKLYN, NEW YORK.

BOTTLE-STOPPER.

SPECIFICATION forming part of Letters Patent No. 327,818, dated October 6, 1885.

Application filed May 27, 1885. Serial No. 166,855. (No model.)

*To all whom it may concern:*

Be it known that I, STEPHEN S. NEWTON, a citizen of the United States, residing at Brooklyn, in the county of Kings and State of New York, have invented certain new and useful Improvements in Bottle-Stoppers, of which the following is a specification, reference being had therein to the accompanying drawings.

The object of this invention is to produce a bottle-stopper one part of which consists of an elastic hood or coupling adapted to fit the necks of variously-sized bottles and secure to such bottles that part of the stopper which carries the valve and valve-seat.

Figure 1 is an elevation of a part of a bottle having my invention applied thereto. Fig. 2 is a central vertical section of Fig. 1 with the valve closed. Fig. 3 is a similar section with the valve opened. Fig. 4 is a horizontal section on line $x\,x$, Fig. 1. Fig. $4^a$ shows a modified discharge-tube. Figs. 5, 6, 7, and 8 are details.

Similar letters of reference indicate like parts in all the figures.

A is the bottle. B is the neck, expanded at its upper end to form an external collar, ring, flange, or shoulder, $b$, of any of the well-known kinds.

C $c$ are the rubber coupling or hood, the lower part, C, of which is of any desired diameter. This hood should be made of vulcanized rubber of good quality, and therefore adapted to be stretched over various sized bottle-necks and to adhere closely thereto. The upper end of this coupling is contracted, as at $c$, and is, by preference, provided at its inner diameter with a rib or bead $c'$, thereby forming an annular groove or recess, $c^3$, between this rib or bead and the vertical part of the coupling for a purpose to be described. $c^2\,c^2$ are a series of re-enforcing or strengthening ribs or beads formed integrally with the main body of the hood.

D $d$ are a metallic discharge-tube, fitting closely at its lower end to the hole or opening through the upper end, $c$, of the hood.

E is a flange projecting laterally from the discharge-tube above the rubber coupling and provided with spurs $e$, and $d$ is a flange at the lower end of the discharge-tube within the rubber coupling, and formed to grip said coupling between this lower flange and the upper flange, E. This lower flange, $d$, may be cast upon the lower end of the tube, but may be made of somewhat smaller diameter than shown in the drawings, and then after the rubber coupling has been placed in position this inner flange may be spread or swaged and forced against the rubber by the use of any suitable tool; or this flange may be crowded up against the rubber by spinning, the discharge-tube being placed upon a suitably-revolving spindle for that purpose, or other suitable means or mode of manufacture may be adopted for forming this lower flange and forcing it against the rubber coupling, the outer edge of this flange $d$ being shown in the drawings as turned up into the annular groove $c^3$, thus forming a secure and permanent connection between the coupling and the discharge-tube.

The upper outer end of the discharge-tube D is screw-threaded, and F $f$ is an internally-threaded hood, fitting the screw-threaded tube and having its lower end turned inwardly, and forming the flange, which will prevent accidental removal of the hood.

G is a valve adapted to close the upper end of the discharge-tube, and formed in one piece with the movable hood F $f$, to which it is united by a diaphragm, $g$, slotted to permit the passage of the liquid.

H is a finely-perforated plate supported within the upper end, $f$, of the hood, where the edge of this diaphragm is confined between an inwardly-projecting rib and the converging upper end, $f$. This diaphragm serves to prevent the entrance of flies or objectionable material, and also strains the liquid passing out from the ball, so as to prevent the discharge of any impurities which are of such size as to prevent their passing through the perforations or reticulations of the plate.

I is a clamping cut ring, of such size and elasticity that it may be conveniently passed over the outside of the coupling and below the rib, flange, or shoulder of the bottle, where it will clamp the coupling and assist in holding it firmly in place.

I' is a similar ring, with its ends overlapping and adapted to be used for the same purpose; or, when preferred, the coupling may be wired or wound with cord; but under ordinary circumstances the elasticity of the rubber will insure that it shall be kept in position.

I do not wish to be limited to the particular construction of parts shown for attaching the rubber coupling to the discharge-tube, because it might be wired, wound, or otherwise secured, although I prefer the method shown in the drawings and described.

The use of the re-enforcing ribs or beads $c^2$ $c^2$ facilitates the holding of the stopper firmly in place upon bottles which differ quite materially in the external configuration of their necks—for instance, with a wine-bottle of ordinary construction in which the shoulder is at a distance of, say, about an inch and an eighth from the upper end of the neck the lower of these re-enforcing ribs (with a properly-sized coupling) will pass immediately below the shoulder. With a bottle in which the upper end of the neck has a narrow flange, rim, or bead, the upper of these re-enforcing ribs will engage with the neck just below the flange or rib. So, also, by reason of the elasticity of the rubber couplings, which, in their normal condition, are of substantially the same size, they can be successfully applied to and used in connection with bottles the necks of which differ materially from each other in size.

By forming the coupling with two or more ribs, $c^2$, as shown, I insure that the clamping-ring I, which lies between two of them, shall be by them prevented from slipping or becoming accidentally displaced.

The cylindrical portion of the coupling, which surrounds the bottle-neck, is of substantially uniform diameter throughout up to the contracted part $c$, which allows the discharge-tube to be brought down close to the upper end of the neck of the bottle whatever may be the shape thereof, whereby it is held in an upright position relative thereto, the lower flange, $d$, of the discharge-tube resting upon the top of the neck of the bottle and being held closely between it and the inward-projecting part, $c$, of the coupling.

I do not wish to be limited to the use of any particular kind of stopper devices for the metallic part of the invention, because many of those well known to the trade might be used in connection with such an elastic coupling without material alteration, except so far as is necessary to permit the coupling and stopper part being firmly united to each other. Nor do I wish to be limited to the use of rubber for the coupling-section, because other elastic or flexible material might be used without departing from the spirit of my invention. Nor do I wish to be limited to making either the discharge-tube or the hood or the valve of metal, because these parts might be made of hard rubber, celluloid, or other suitable material which is sufficiently inflexible and strong for the purpose. Nor do I wish to be limited to a discharge-tube which is closed by a valve, because under some circumstances I propose to use the plain tapering tube shown in Fig. 4$^a$, particularly for bottles which contain such liquids as pepper-sauce, flavoring extracts, or tinctures, articles composed in whole or in part of oils or other materials which are commonly delivered by shaking the bottle with the stopper projecting downward.

What I claim is—

1. In a bottle-stopper, the combination of a discharge-tube provided near its lower end with flanges and a flexible coupling-tube having a contracted inward-extending part, $c$, held between said flanges, and a cylindrical part adapted to fit over the neck of a bottle, the lower flange of the discharge-tube being situated between the neck of the bottle and the part $c$ of the coupling-tube, whereby the discharge-tube is held in an upright position relative to the bottle-neck, substantially as set forth.

2. In a bottle-stopper, the combination, with a discharge-tube provided at its lower end with flanges $d$ and E, of a flexible coupling-tube having its upper end contracted and provided with rib $c'$ and groove $c^3$, said contracted portion lying between the flanges, the outer edge of the lower one, $d$, of which is turned up into the groove to unite the coupling and discharge-tube, substantially as set forth.

3. In a bottle-stopper, the combination, with a discharge-tube provided at its lower end with a flange, $d$, and with a flange, E, situated above flange $d$, and the downward-projecting spurs $e$, carried by the upper flange, of a flexible coupling adapted to unite the discharge-tube with the neck of a bottle having a portion lying between the flanges $d$ and E, with which portion the spurs $e$ engage to assist in securing the discharge-tube and coupling, substantially as set forth.

4. In a bottle-stopper, the combination, with a discharge-tube and a flexible coupling uniting the discharge-tube with the neck of a bottle, of an elastic clamping-ring arranged to encircle the coupling and secure it to the neck of a bottle, substantially as set forth.

5. In a bottle-stopper, the combination of the discharge-tube, the movable hood F $f$ at the upper end of the discharge-tube, the valve formed in one piece with the movable hood, and a perforated plate arranged above the valve and within the reduced part $f$ of the hood, substantially as set forth.

In testimony whereof I affix my signature in presence of two witnesses.

STEPHEN S. NEWTON.

Witnesses:
  H. H. DOUBLEDAY,
  C. T. STRINGHAM.